US008674279B1

(12) United States Patent
Thel et al.

(10) Patent No.: US 8,674,279 B1
(45) Date of Patent: *Mar. 18, 2014

(54) INDEPENDENTLY POWERED SOLAR TRACKER CONTROLLING DEVICE WITH PROGRAM TO SELECT ALTERNATIVE SOURCE OF POWER SUPPLY TO ASSURE FUNCTIONALITY

(75) Inventors: AntoniBogdan Thel, Epson, NH (US); Steven L. Clark, Derry, NH (US)

(73) Assignee: Concrete Systems, Inc., Hudson, NH (US)

( * ) Notice: Subject to any disclaimer, the term of this patent is extended or adjusted under 35 U.S.C. 154(b) by 167 days.

This patent is subject to a terminal disclaimer.

(21) Appl. No.: 12/653,840

(22) Filed: Dec. 21, 2009

(51) Int. Cl.
*G01J 1/20* (2006.01)
(52) U.S. Cl.
USPC .................. 250/203.4; 60/641.8; 60/641.11; 136/244; 136/245; 244/172.7
(58) Field of Classification Search
USPC .......... 250/203.4; 60/641.8, 641.11; 136/244, 136/245; 244/172.7
See application file for complete search history.

(56) References Cited

U.S. PATENT DOCUMENTS

| 7,098,864 | B2 * | 8/2006 | Ryan | 343/890 |
|---|---|---|---|---|
| 2009/0199846 | A1 * | 8/2009 | Collins et al. | 126/601 |
| 2010/0139645 | A1 * | 6/2010 | Whipple et al. | 126/576 |
| 2011/0194900 | A1 * | 8/2011 | French, Sr. | 405/229 |

* cited by examiner

*Primary Examiner* — Seung C Sohn
*Assistant Examiner* — Kevin Wyatt
(74) *Attorney, Agent, or Firm* — Ctephen W. White

(57) ABSTRACT

A dual axis motorized solar tracking device that can be rotated over 360° and wherein the solar array panel thereof can be tilted from 90° to 10° and wherein the motorized portions of said device is controlled by an internally contained computerized controlling system that is programmed to follow the path of the sun at the installed location thereof and also to adjust the system to allow for any problems in weather. The internally contained computerized controlling device is electrically actuated from a plethora of sources including a separate panel on the solar array dedicated to recharging an energy storage cell system that will power up the internally contained and computerized controlling system. Alternatively, other power sources external to the device may also be employed giving this system a unique ability to keep on running while charging the energy storage cell system under any circumstances. A lithium-ion battery can be used as the rechargeable battery system.

3 Claims, 2 Drawing Sheets

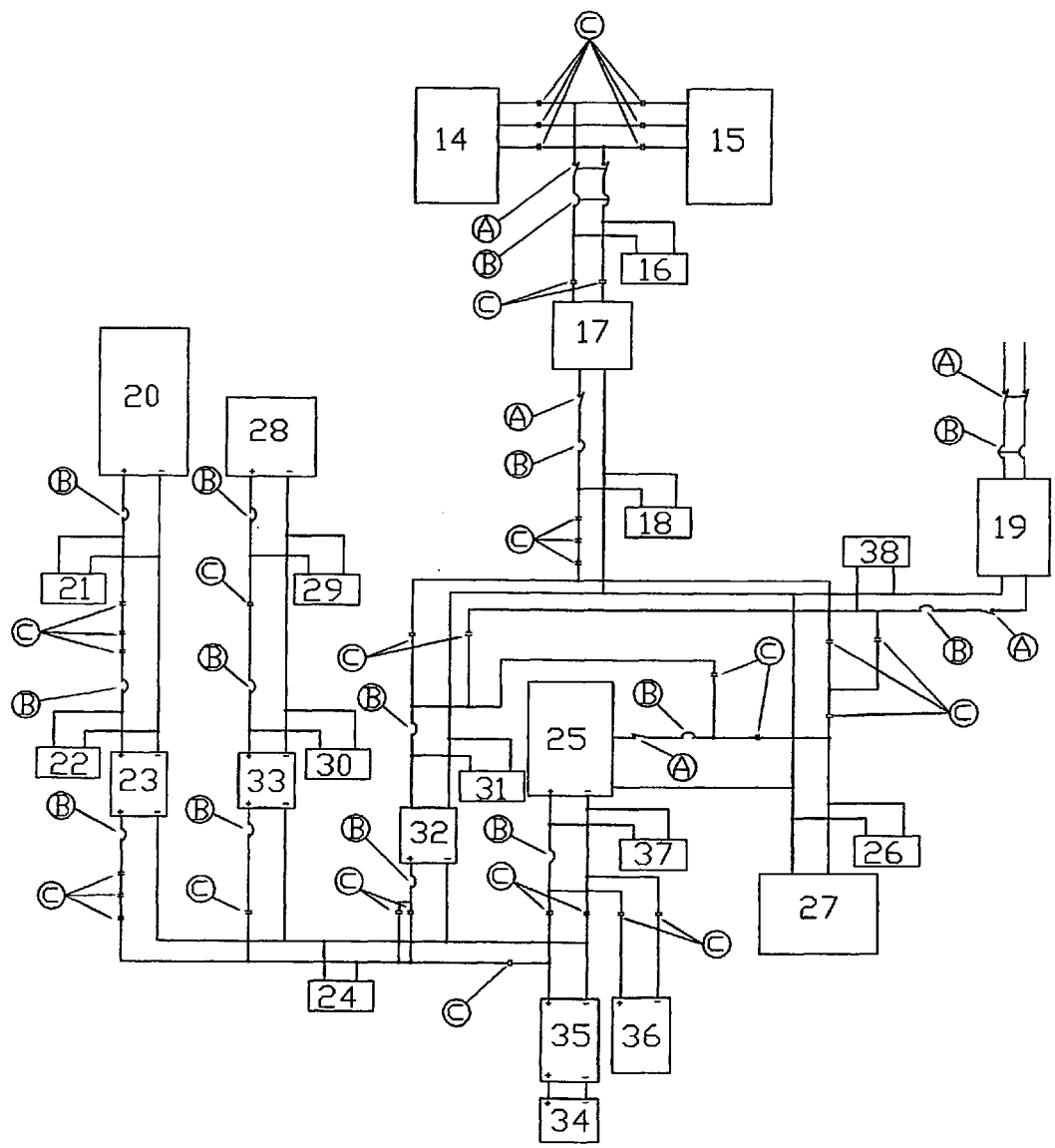

INDEPENDENTLY POWERED SOLAR TRACKER CONTROLLING DEVICE WITH PROGRAM TO SELECT ALTERNATIVE SOURCE OF POWER SUPPLY TO ASSURE FUNCTIONALITY

CROSS-REFERENCE TO RELATED APPLICATIONS

This application is related to commonly assigned and recently filed application U.S. Ser. No. 12/570,749, filed Nov. 18, 2009, entitled "Segmented Ballast Base Support System for Solar or Wind Generating Devices in Unstable Grounds Installation" and U.S. Ser. No. 12/653,163 filed Dec. 9, 2009 entitled "Improved Solar Tracking Device". now U.S. Pat. No. 8,168,931 B1, May 1, 2012.

BACKGROUND OF THE INVENTION

1. Field of the Invention

This invention relates to solar tracking devices that are used to collect energy from the sun and to transform and transmit that energy for use elsewhere. This invention also relates to automatic control of such solar tracking devices which can be adjusted to capture the maximum sunlight and to ensure that damage does not happen when storms arise. More specifically, this invention relates to a unique system of providing power to operate such solar tracking devices with a plurality of power resources available and, predominantly, without taking away power from the system that is providing power transmission elsewhere. Even more specifically, this invention relates to a system that can produce more power from solar tracking devices than prior art elements.

2. Description of the Prior Art

Solar tracking devices are known and are now beginning to be widely used since there is a pressing need to find alternative energy sources, alternative to fossil fuels, for example. Currently there is a push to install solar energy capturing some to generate power for individual homes and some to gather power for transmission outside. Those that are gathered together are generally in so-called solar farms, and they may include a plethora of devices joined together to produce a larger quantity of energy such as electricity and then feed this energy into the normal grid to augment conventional electrical power generators, such as coal, oil and gas fired plants, nuclear and water power devices such as those associated with dams and the like. Conventionally, these solar farms are placed in areas where there are large, open spaces and where there are abundant periods of sunshine. Lately, pressure has been applied to use areas that were once large dumps or so-called brownfields or sites that have been closed due to high levels of pollution. These areas are usually recovered by large amounts of soil and can even have substrates of film such as polyethylene and the like. These sites are unstable and not well-suited for the placement of large, heavy objects such as solar tracking devices and the like. In a previously filed application Ser. No. 12/590,749, entitled "Segmented Ballast Base Support System for Solar or Wind Generating Devices in Unstable Grounds Installation", we describe how this problem is solved by the use of a special ballast base support system that is segmented and large enough to spread the weight over unsteady grounds.

Prior art solar tracking devices can be fixed in place or they can be provided with elements that will track the sun's path and thus provide more energy capture. These are the so-called single axis tracking devices. Others include the means to move the solar tracking element itself out of harm's way in the case of high winds or storms. These are called dual axis tracking devices. These devices are provided with a computerized system that can be set to inform the solar tracking device of when movement is required. The prior art dual tracking devices are deficient in that they cannot fully rotate 360° or tilt the solar capturing device itself more than 80°. In our previously filed application Ser. No. 12/653,163 entitled "Improved Solar Tracking Device", we describe a system that overcomes the deficiencies of the prior art in that this device can easily rotate 360° and can tilt to about 10° vertically.

All of the prior art devices described suffer from a lack of total control in that the system is dependent on the presence of a power supply. Most of these prior art dual axis tracking devices take power directly from the grid or from the tracking element itself and some also provide simple lead acid battery back-up systems. It is thus an object of this invention to provide a solar tracking device with a unique system that employs control elements that can be powered with a variety of power supplies and thus be functional over any period of time and in times when storms and the like require the device to shut down to avoid damage.

SUMMARY OF THE INVENTION

These and yet other objects are achieved in a system and method for controlling a dual axis solar tracker device having an array of varying numbers of panels, with one being dedicated for charging an energy cell, said array designed for capturing light from the sun and creating energy therefrom and said array is rotatable continually over 360° in the horizontal position and can be tilted from 90° to 10° in the vertical position relative to the earth comprising a base on which a lower, fixed column is mounted, a motorized rotating device, a rotatable upper column, and a flat panel array having a motorized tilting device mounted from said upper column and a computerized system with wireless communications programmed and adjusted to rotate said device and to tilt said panel array as required. In yet other embodiments, said computerized system is provided with a battery power source and wherein said $65^{th}$ panel of said array is designed to charge said battery power source.

BRIEF DESCRIPTION OF THE DRAWINGS

FIG. 2 is a flow-sheet description of the elements designed to feed power to the programmable computerized system in a novel manner with alternative power supplies.

DETAILS OF THE INVENTION

Figure 1:
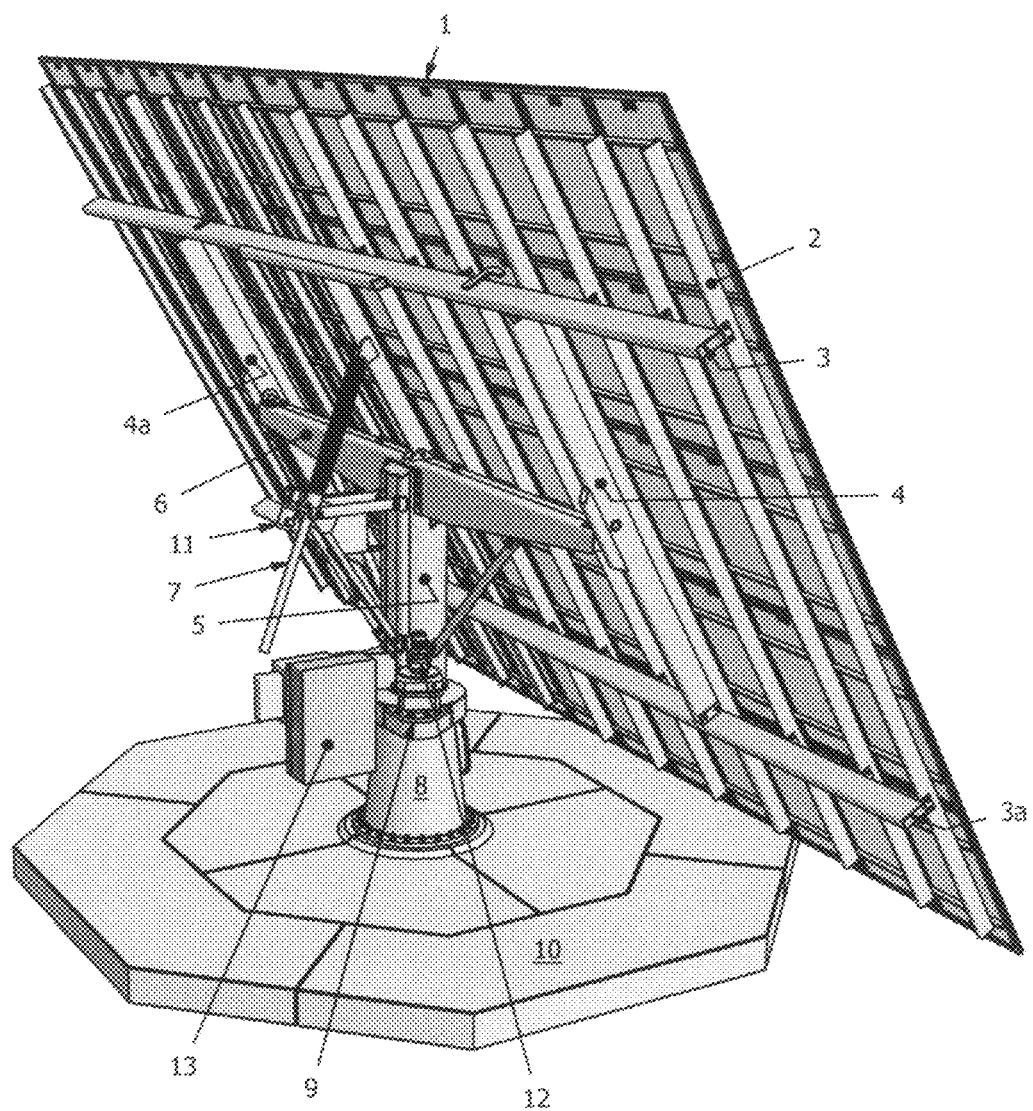
FIG. 1 is a showing of a typical dual axis solar tracking device of this invention.

Looking now specifically at the drawings that accompany this invention which show the best mode of operation at the time of filing, but to which inventor is not limited, FIG. 1 shows a perspective view of a typical dual axis solar tracking device of this invention. In this FIG. 1 is the solar array made up of a number of solar panels joined together. Electrical elements will adjoin all of these panels and will flow downwardly (not shown in the figure). The array is supported by a number of transversal beams, one of which is shown as 2. Two larger longitudinal beams are shown as 3 and 3a and another pair of cross beams as 4 and 4a. An upper rotatable column is shown as 5 and this is movably connected to cross beams 4 and 4a via main beam 6. The panel tilting device is shown as 7 with a motor driving device shown as 11. Upper rotatable column 5 is connected to the lower column 8 at movable joint 9 and is further firmly attached to the base support 10. Another motor driving device for driving the rotating column is shown as 12. Adjacent to the bottom of the rotating column 5 a paneled cabinet is shown as 13. Within this cabinet are located all of the elements requisite to ensure the proper rotation and tilt of solar array 1. These elements include a computerized system for informing the device as to when it is requisite to rotate and tilt as well as the electronics necessary to ensure that this occurs. Also present may be an energy storage cell for powering these devices. This energy storage cell is primarily charged by a single panel in the solar array (not shown herein). Additional power supplies may come from the array itself, grid, or some other outside source such as various power generation systems.

FIG. 2 is a flow sheet that describes all of the various elements that are contained in paneled cabinet 13 from FIG. 1. Here, 14 represents renewable power that can be taken from the solar array 1 which can feed electrical power from this renewable source into the grid while 15 represents power that can come from the grid itself. Power from these two sources can be sent to a surge protector at 16 and from thence to a transformer at 17. It then goes to a surge protector at 18. Block 19 represents yet another power supply that can be applied if necessary, such as power from an auxiliary generation system (not shown herein) or another regulated DC power source at Block 36. Block 20 represents a single panel from the solar array. It is conventional, in a normal power generating system such as this to have 64 panels in place on the solar array 1. In this instance, I prefer adding a $65^{th}$ panel and dedicating the entire source of power for recharging of the energy storage cell Shown throughout FIG. 2.

The primary source of charging power for the energy storage cell comes from a DC output shown as Block 20 and travels down where there are surge protectors at 21 and 22. The power then goes into a primary DC power charger shown as 23 and where there is also a surge protector at 24 and then goes through a battery management system at 35 and subsequently into the energy storage cell at 34. If the energy storage cell is above the low power set point then the power is permitted to flow where there is a surge protector at 37 and then to power source inverter at 25. This converts the power to AC and it is fed down to surge protector at 26 and from thence to the intelligent power supply system shown as 27. This represents the computer system that can control the motors for rotating device 9 and the tilt device motor 11 from FIG. 1

An alternate source of charging power for the energy storage cell is a regulated DC source of power shown as block 28. Power from this source travels down to surge protectors at 29 and 30. The power then goes into a secondary DC powered charger seen at 33 and to a surge protector at 24 and subsequently through the battery management system at 35 and from thence into the energy storage cell at 34. This power simultaneously flows to a surge protector at 37 and then into primary power source inverter at 25. This power then travels down to a surge protector at 26 and can also provide power for the intelligent power control supply system at 27. As previously mentioned, this represents the computer control system as previously described above.

Another source of charging power for the energy storage cell is an AC source of power shown as block 14. This power travels down through a surge protector at 16 and then through a transformer at block 17. From there this power goes through surge protectors at 18 and 31 and then into a secondary AC power charger at 32 where a surge protector is located at 24. From there, the power goes through the battery management system at 35 and into the energy storage cell at 34 and simultaneously flows into a surge protector at 37 and into a source inverter at 25. The power then travels down to a surge protector at 26. It can also provide power for the intelligent power control supply system at 27 which also represents the computer system as previously mentioned above.

Still another alternative source of charging power for the energy storage cell is an AC source of power shown as block 15. This power travels down to surge protector 16, through the transformer at block 17, to surge protectors at 18 and 31, into a secondary AC powered charger at 32, surge protector 24 and through the battery management system at 35. The power supplies the energy storage cell at 34 and flows to surge protector 37 and then into the primary power source inverter at 25. Finally, it passes to surge protector 26 and can provide power for the intelligent power control supply system at 27 which also represents the computer system as previously mentioned above.

Yet another alternative source of charging power for the energy storage cell is a regulated AC source of power shown as block 19. This power travels to surge protectors at 38, 31 and 26 and from there into a secondary AC power charger at block 32 where there is a surge protector at 24. From there, the power goes through the battery management system at 35 and then into the energy storage cell at 34. Simultaneously the power flows into a surge protector at 37, into the primary source inverter at block 25 and surge protector at 26. It too can also provide power for the intelligent power control supply system at 27, which represents the computer system as previously mentioned.

Still another alternative source of charging power for the energy storage cell is a Regulated DC auxiliary power at block 36. This power goes to a surge protector at 37 and into a primary power source inverter at block 25. Then the power travels to surge protectors at 26 and 32 and simultaneously to the secondary AC charger at block 31. There is another surge protector located at 24. From there the power goes to the battery management system at block 35 and from there to the energy storage cell at block 34. It too can also provide power for the intelligent power control supply system at 27, which represents the computer system as previously mentioned.

In order to better understand how we use the system already in place to provide a source of power without detracting from that being generated for the grid, we normally think of a panel of 16 in each string of panels on the solar generating device shown herein. There are 4 strings and thus 64 panels or modules, each panel producing 18.2 volts and 11.27 amps at peak performance. By calculation, then, each panel will produce 205.114 watts of power and 291.2 volts in each string of 16. To this we add a single panel designated as a power supply for the rechargeable energy storage cell running the intelligent power supply. Even though we describe a system with 64 panels+1 for the power supply we might have more or less dependent on the system envisioned. The number of panels in any string is dependent on the panel output voltage and amperage and the required inverter input voltage of the device itself. The size of the array is based on the required output wattage of the inverter. Thus, the number of panels in a string and the number of strings can change as the array inverter requirements change.

Block 34 represents a rechargeable energy storage cell that is the main power source for this entire system as shown in FIG. 2. Thus, this cell can be charged by all of the power supplies described above. Block 35 represents a device that measures the state of the charge in the rechargeable energy storage cell. Switches present in the system are all shown as A and circuit breaker points as B. Contact points are shown as C. It should be pointed out that this system is also well grounded at every surge protector and that various other arrangements of switches, circuit breakers and contact points may also be part of this schematic.

My system is particularly unique since it provides for a virtual plethora of power sources to ensure that the intelligent power supply is always available to power on the motors that control both the rotation and tilt of this novel dual axis solar tracker. This is extremely important because if the power failed to activate this intelligent power supply at the proper time and place and conditions, the device might not track the sun's progress properly and fail to generate the desired power. Additionally, if a storm was approaching and the weather program was waiting to tilt the array, if power was not available at the proper time, severe damage might occur and since these devices are expensive to make, manufacture and install, this would be catastrophic for the device itself. A large number of solar arrays are usually mounted in a field to form a solar farm and much investment is required to do so. Thus, it is important that each device has the requisite power in place in order to perform this delicate and necessary function.

Looking now specifically at FIG. 2, I prefer the following systems to be functioning in this order:

First, block 34, the rechargeable energy storage cell, is the primary power supply for the intelligent power supply system. I prefer a lithium-ion cell here. The alternative power sources can be prioritized in any order to automatically engage if the storage cell energy is below a lower power set point. Thus, the power emanates from the rechargeable energy storage cell by but alternative power is always available to both run this device and to keep the energy storage cell in a fully charged or operational condition.

Second, block 28, the renewable energy source provided by the regulated DC power, is next. This power is taken out of the DC power produced by a dedicated power source and does not detract from that being fed into the grid. This power source can provide enough renewable power to run the entire system.

Third, block 14, the renewable energy source from the PV-array itself. This also can provide all of the requisite energy to run the entire system.

Fourth, block 15, the energy source from the grid itself and can provide all of the requisite energy to run the entire system.

Fifth, block 19 represents the energy source provided by and external power source such as an auxiliary AC generation system. It can also provide the requisite power for the entire system.

Sixth, block 36 represents an auxiliary regulated DC power source that can also provide the requisite power for the entire system.

The above mentioned alternative power sources can simultaneously provide power for the intelligent power supply system and provide power for recharging the energy storage cell. Alternatively, one power source can provide power for the system and another provides power to recharge the energy storage cell. These sources are all controlled and manipulated by the intelligent power supply system.

This alternative supply of power coupled with the unique design of the dual axis solar tracker makes my system a far better element than any other device found in the prior art. It is efficient and proactive and can answer the needs of such devices when they are out in the field for long periods of time without attention. The efficiency of this system is greater than those in the prior art since it can track the sun's movement with greater accuracy and the movements of the solar array itself are greatly improved. Thus, since the tilt ability permits the array to tilt from 90° to 10° the solar array can take advantage of any of the sun's radiation off the snow pack during the winter months. No other prior art fixed, single or dual axis tracking device can achieve these efficiencies of operation. Because of the construction and operational abilities of this novel dual axis tracker system such a unit is designed to last more than 25 years in operation. That is considerably more than any other system currently in use in the prior art. Thus, this unit will continue to produce power and achieve a lower ratio of power to cost.

As an energy storage cell, I prefer the use of lithium-ion batteries. They're generally much lighter than other types of rechargeable batteries of the same size. The electrodes of a lithium-ion battery are made of lightweight lithium and carbon. Lithium is also a highly reactive element, meaning that a lot of energy can be stored in its atomic bonds. This translates into a very high energy density for lithium-ion batteries. A typical lithium-ion battery can store 150 watt-hours/kilogram as compared to only 25 hours in a lead-acid battery. They hold their charge and typically lose only about 5% of the charge/month and essentially have little or no memory effect. They also can handle hundreds of charge/discharge cycles. Thus, they work extremely well in this system since they need little or no human supervision.

As previously mentioned, my system is unique in the ability to call on a variety of power supply sources in order to keep on running. There is no essential loss of power supply from the grid if the single ($65^{th}$) panel is in place and in operation, or using one of the alternate power sources other then the grid to power the intelligent power supply system or charge the energy storage cell. Having such alternative sources is highly effective for units like these which are placed in farms and usually far away from those responsible for their upkeep. The entire system is designed around this feature and the alternative supply process.

The intelligent, computerized power supply element can be programmed following with the desired location to which this entire device is to be installed. This programming takes into account the year-round position of the sun at that location and then automatically adjusts the rotation and tilting mechanisms so that the entire device follows the changes in location on a daily basis. Additionally, a weather station can be tied into this system so that changes in the weather are duly noted and the entire device can be adjusted to meet any weather related problems.

What is claimed is:

1. An improved dual axis solar tracking device intended for ground installation and suitable for installing over unstable or unsteady grounds and designed for generating power from solar energy comprising in order:
   a. segmented cementitious ballast base support;
   b. a lower fixed column having a top, a bottom, an exterior, an interior and wherein said bottom is firmly attached to said base support;
   c. a motorized rotating device having an upper surface and a lower surface, wherein said lower surface is firmly attached to the top of said lower column;
   d. an upper rotatable column having a top, a bottom, an outer surface and an inner surface, wherein said bottom is rotatably fixed to the upper surface of said motorized rotating device;
   e. a tiltable solar panel array located on the top of said rotatable column;
   f. a motorized tilting device attached to said solar panel array and to the exterior of said rotatable column and having a cabinet located on said exterior of said rotatable column;
   g. an electrically operated and computerized controlling device located in said cabinet which controls said motorized rotating device and said motorized tilting device, wherein said motorized rotating device moves said upper rotatable column over 360° in the horizontal position relative to the earth and wherein said motorized tilting device tilts said solar panel array from 90° to 10° in a vertical position relative to the earth and wherein said computerized controlling device is further connected to an outside source for supplying weather and sun location conditions on a daily basis so that said computerized controlling device can received directions to ensure that said solar panel array is constantly facing the sun and wherein said solar panel array can be moved safely away from any weather problems that might arise;

h. a rechargeable energy storage battery system capable by itself of supplying sufficient power to said electrically operated and computerized controlling device to accomplish the movements of said tilting device containing said solar panel array; and, i. wherein said storage battery is connected to power supplied external thereto.

2. The improved dual axis solar tracking device of claim 1 wherein said rechargeable energy storage battery system is a lithium-ion battery and said external source of power is a separate panel located on said solar panel array.

3. The improved dual axis tracking device of claim 1 wherein power supplied externally is an external electrical source taken from the outside grid.

* * * * *